S. M. LILLIE.
EVAPORATING TUBE.
APPLICATION FILED APR. 10, 1907.

988,477.

Patented Apr. 4, 1911.

WITNESSES:

INVENTOR
Samuel Morris Lillie
BY
ATTORNEY.

UNITED STATES PATENT OFFICE.

SAMUEL MORRIS LILLIE, OF PHILADELPHIA, PENNSYLVANIA.

EVAPORATING-TUBE.

988,477.  Specification of Letters Patent.  Patented Apr. 4, 1911.

Application filed April 10, 1907. Serial No. 367,334.

*To all whom it may concern:*

Be it known that I, SAMUEL MORRIS LILLIE, of the city and county of Philadelphia and State of Pennsylvania, have invented an Improvement in Evaporating-Tubes, of which the following is a specification.

My invention has reference to evaporating tubes and consists of certain improvements which are fully set forth in the following specification and shown in the accompanying drawings which form a part thereof.

The object of my invention is to provide a construction of evaporating tube suitable for evaporating apparatus which shall embody simplicity of construction, cheapness of production and effectiveness in use.

The invention is more particularly intended as an improvement in the type of evaporating tube set out in Letters Patent No. 740,449, dated October 6th, 1903, granted to me and in which the end of the tube is closed by a head or bushing to prevent the free escape of the steam through the tube. In this construction the head or bushing has been secured in place within the tube by bending the metal of the tube over the end of the head or into a channel in the bushing and soldering or sweating the two parts together with a fusible metal.

In my present invention I insure the joint being made very tight by first expanding the end of the tube by heat and then inserting the head or bushing and after shrinking the tube upon said head or bushing, depressing the metal of the tube preferably upon each side of the head or bushing or a portion thereof so as to lock it in position. I may subsequently solder, braze or sweat the joint with a more fusible metal than that employed in either the tube or head.

My invention also comprehends details of construction which, together with the features above specified, will be better understood by reference to the drawings, in which:—

Figure 1:
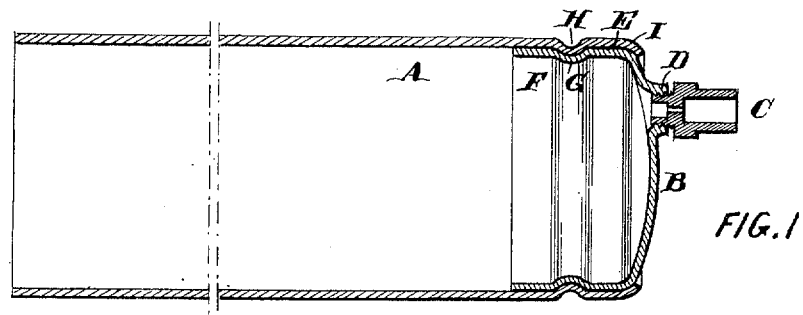
Figure 2:
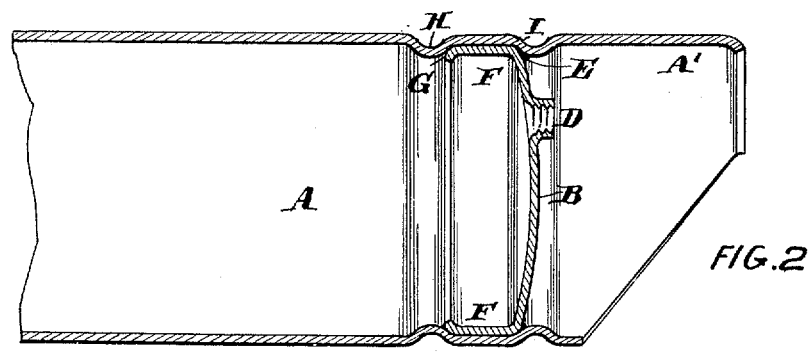
Figure 4:
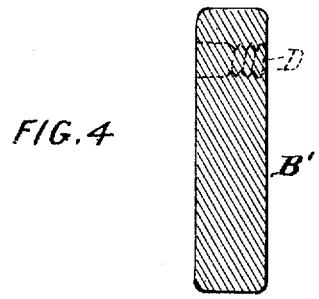
Figure 3:
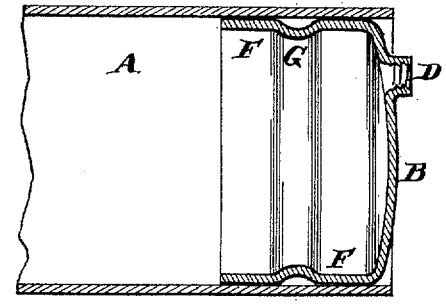

Figure 1 is a longitudinal section of the end of an evaporating tube embodying my invention; Fig. 2 is a similar section of a modified form of the same; Fig. 3 is a section showing the manner of preparing the joint; and Fig. 4 is a sectional view of one form of bushing which may be employed with my invention.

A is the tube and is usually made of copper or other ductile metal.

B is the head or bushing which is secured in the end of the tube. This head or bushing has a peripheral portion F which in the case where the head or bushing is made of sheet metal, may be in the form of an inwardly directed flange. The outer face may be flanged and screw threaded as at D for the reception of the vent plug C which I usually employ in such evaporating tubes when used in multiple effect evaporating apparatus as indicated in my aforesaid patents. The outside diameter of the head or bushing is slightly greater than the normal internal diameter of the end of the tube so that when the tube is heated it expands sufficiently to permit the insertion of the head or bushing, after which the tube is allowed to shrink and form a tight joint with the head or bushing. As no machine fitting is employed, there is tendency that the joint will not be steam tight in all cases, and to overcome this I sweat the joint with a more fusible metal than that of which the tube and head or bushing is formed as indicated at E. To make the joint more secure, I sometimes inwardly flange or bead the outer edge of the tube A over the end of the head as at I and this should be done before sweating.

Where the flange or peripheral portion F of the head is long, as shown in Fig. 1, I prefer to provide it with a peripheral groove G and also to inwardly depress the pipe to fit said groove as indicated at H. In this way the parts H and I inclose a peripheral portion of the head or bushing and hold it against shifting in either direction whether under pressure or vacuum. The grooving of the flange of the head also gives it strength.

In Fig. 2, I have shown the same construction as in Fig. 1 except that I have omitted the inner extension of the flange beyond the center of the groove G, and have shown the tube extended as at A' to act as a shield against the down flowing water striking the vent plug C. This overhanging end or shield is shown in my patent of 1903 aforesaid. The construction of Fig. 2 does not differ materially from that of Fig. 1 in principles of construction. The turned-in or beaded portion I in this case, however, would have more or less of the appearance of a groove in the outside.

When the parts A and B are secured together by shrinking and before beading or grooving, they are as shown in Fig. 3 and the joint in this form is mechanically strong but not necessarily steam or vapor tight, and hence the subsequent additions are to make it steam and vapor tight and add additional strength.

Instead of using a stamped or spun sheet metal head or bushing as shown in Figs. 1, 2 and 3, the bushing or head may be of cast metal as shown in Fig. 4, in which case it would more nearly approximate the head or bushing of Fig. 2.

While my invention is especially designed for evaporating tubes into which the steam is led through one end it is evident that these tubes may be used for any other suitable purpose to which they are found suitable. I do not confine myself to any diameter or length of tube. It is also quite evident that the joint and general construction may be used when the tubular part is employed as a body of a vessel or tank for retaining gas or liquid or for any other purpose.

In this application I do not claim the method of making the evaporating tube nor of the joint employed between the bushing and tube thereof, as said method forms subject matter of a separate application.

Having now described my invention, what I claim as new and desire to secure by Letters Patent, is:—

1. A closure for an evaporating tube consisting of a sheet metal bushing frictionally secured within the tube, the metal of the tube being bent inwardly beyond the edge of the bushing to hold it against longitudinal shifting, and said bushing having an upset tubular threaded flange, and a vent plug secured in the tubular threaded flange.

2. A closure for an evaporating tube consisting of a bushing having an external diameter slightly greater than the diameter of the tube at normally atmospheric temperatures and frictionally held within the tube, said bushing formed with an outer head B and an inward flange F and in which the metal of the tube is inwardly curved circumferentially at two places in its length and between which the bushing is wholly located to prevent it from shifting longitudinally of the tube, and a vapor-tight joint between the bushing and tube composed of a metal more fusible than the metal of these parts.

3. A tubular body having two circumferential inward beads, combined with a bushing frictionally held in place within the tube and having its contacting perimeter located wholly between the inward beads, and a sweated joint between the tubular body and the bushing and extending between the inward beads and formed of a metal more fusible than the metal of the body or bushing.

4. A bushing formed of pressed sheet metal having an inwardly directed circumferential groove and of a head or diaphragm shaped head at one end, combined with a tubular body inclosing the bushing and engaging it to form a tight frictional contact and also having a circumferential portion of its body inwardly grooved so as to form an internal bead fitting the groove in the bushing, and further having its metal bent inwardly over the diaphragm shaped head of the bushing and in contact therewith.

5. A bushing having an inwardly directed circumferential groove, combined with a tubular body inclosing the bushing and engaging it to form a tight frictional contact and also having a circumferential portion of its body inwardly grooved so as to form an internal bead fitting the groove in the bushing and having the outer free end flanged inward over the outer edge of the bushing and in direct contact therewith to hold it.

6. A closure for an evaporating tube structure, consisting of a bushing having an internal diameter slightly greater than the diameter of the tube when cold and held in place by frictional contact, the said bushing being so located within one end of the tube that a small edge of the tube extends over the periphery of the bushing and is flanged inwardly over the outer edge of the bushing adjacent to its perimeter and in direct contact with it.

In testimony of which invention, I have hereunto set my hand.

S. MORRIS LILLIE.

Witnesses:
JOHN J. WALTER,
COLIN D. SMITH.